United States Patent Office 3,764,458
Patented Oct. 9, 1973

3,764,458
IONIC ALPHA-OLEFIN COPOLYMER
ADHESIVE LAMINATE
Kenneth D. Ziegel, Wilmington, Del., assignor to E. I. du Pont de Nemours and Company, Wilmington, Del.
No Drawing. Filed Mar. 11, 1971, Ser. No. 123,465
Int. Cl. B32b 15/08, 17/10, 31/12
U.S. Cl. 161—190                 23 Claims

ABSTRACT OF THE DISCLOSURE

A laminated structure having good peel strength and using a simple one-coat adhesive composition, said laminated structure consisting essentially of an elastomeric copolymer of at least one $C_2$–$C_8$ α-olefin adhered to a substrate by a composition consisting essentially of (1) an ionic copolymer of ethylene and a $C_3$–$C_8$ α,β-unsaturated carboxylic acid containing about 3–25 weight percent of said acid units and
(2) about 0.05–0.60 equivalents of a polyvalent metal compound based on the acid groups in the ionic copolymer.

---

This invention relates to laminates of normally solid chain-saturated α-olefin copolymers and more particularly, to an adhesive composition and method for bonding solid α-olefin copolymers to other substrates.

The high resistance to weather, age, heat, and ozone of normally solid α-olefin copolymers makes them good candidates for use as protective coatings and energy-absorbing layers for automotive and industrial products such as bumper coatings, tank liners, shock absorbers, motor mounts, wheels, tires, wire, cable, curtains, diaphragms, etc. These polymers are more difficult to bond to metal and other customary substrates than polymers having a higher degree of unsaturation or suitable substituents; and no satisfactory simple adhesive and one-coat bonding method has been known, especially for cured articles of such polymers. Known adhesives and bonding methods useful with such polymers have been limited to use with particular substrates, with uncured polymers, or required complicated procedures. Some of these methods are disclosed in U.S. Pats. 3,367,827 to Gallagher; 3,449,-204 to Souffie; 3,502,603 to Gallagher et al.; and 3,179,-554 and 3,347,817 both to Gladding et al. Certain α-olefin polymers and especially elastomers present particular difficulties in bonding to substrates such as metal. Representative of these polymers are ethylene/propylene elastomers both cured and uncured and particularly ethylene/propylene/non-conjugated diene polymers. These difficulties are described in "Milestones in Elastomer-to-Metal Bonding," Adhesives Age, p. 34, June 1970, and Treatise on Adhesion and Adhesives, II Ch. 4 (1969), Marcel Dekker, Inc., New York. There has been a need for a simple and convenient adhesive and bonding method by which normally solid chain-saturated, α-olefin copolymers could be bonded to substrates, particularly to metal objects such as automobile bumpers, to produce a weather-resistant, wear-resistant, shock-absorbing bumper.

It has now been discovered that solid α-olefin copolymers can be bonded to substrates generally by a simple one-coat ionomeric adhesive composition and method to form laminates having good peel strength between the layers. According to this invention there is provided a laminated structure consisting essentially of an elastomeric copolymer of at least one $C_2$–$C_8$ α-olefin adhered to a substrate by a composition consisting essentially of a mixture of (1) an ionic copolymer of ethylene and a $C_3$–$C_8$ α,β-unsaturated carboxylic acid containing about 3–25 weight percent of said acid units, and
(2) about 0.05–0.60 equivalents of a polyvalent metal compound based on the acid group in the ionic copolymer.

The structure of this invention is produced by a process consisting essentially of interposing said adhesive between the elastomeric copolymer layer and substrate layer and bonding said layers at a temperature of at least about 140° C. and superatmospheric pressure. A temperature range of about 140–265° C. can be used, but temperatures of 140–210° C. are preferred.

The adhesive composition used for this invention is a mixture of a metal compound and a copolymer of ethylene with a low molecular weight α,β-unsaturated carboxylic acid. The ethylene-carboxylic acid copolymer is a thermoplastic normally solid copolymer. The ionomeric adhesive composition can be used as a solid, powder, film, dispersion, or hot melt.

Carboxylic acids which can be used to prepare ionic copolymer are low molecular weight ethylenic (α,β-unsaturated) monocarboxylic acids or their equivalents and are sometimes referred to as acrylic acids. Preferred acrylic acids have 3–8 carbon atoms. Acrylic acid ($C_3$), methacrylic acid ($C_4$), and pentenoic acid ($C_5$) are especially preferred. The carboxylic acid is polymerized with ethylene by known methods in such a manner that 3–25 weight percent, preferably 10–20 weight percent, carboxylic acid units are present in the ionic copolymer.

Polyvalent metal compounds which can be used are compounds of the metals of Groups Ib, II, IIIa, IV, VIb, and VIII of the Periodic Table as published in the 45th edition of The Handbook of Chemistry and Physics by the Chemical Rubber Co. Preferred metals in these groups are magnesium, calcium, strontium, barium, titanium, tin, iron, cobalt, nickel, copper, zinc, chromium, aluminum, and cadmium. Compounds of magnesium, copper, and zinc are especially preferred for economy and good adhesive properties. Zinc compounds, such as oxide, hydroxide, and acetate, are particularly effective with iron and various types of steel substrates.

The metal compound is admixed with the ethylene/carboxylic acid copolymer in sufficient amount to neutralize 5–60 percent of the acid groups in the copolymer; that is, 0.05–0.60 equivalents of metal compound, based on the acid groups in the copolymer, are mixed with the copolymer to partially neutralize the carboxyl groups. The degree of neutralization is stoichiometrically calculated or can be determined by standard analytical methods such as pH measurement or infrared measurement. The metal compound must be capable of forming a salt with the carboxylic acid units of the ionic copolymer; therefore, it is necessary to add a trace of an ionizing agent such as acetic acid with certain metal compounds such as oxides. With other compounds, such as the metal acetates, ionizing agent is not necessary.

The metal compounds can be oxides, hydroxides, carbonates, sulfates, silicates, formates, ethoxides, nitrates, or acetates of the particular metal used. Oxides, hydroxides, and acetates are preferred for convenience. Other compounds which do not interfere with the adhesive and copolymer bonding can be used as long as the metal ion effectively combines with the carboxyl groups of the adhesive copolymer and the remaining radical can be removed or does not substantially interfere with bonding. Particular ethylene/carboxylic acid/metal compound compositions can be prepared according to U.S. Pat. 3,264,-272 to Rees.

Alpha-olefin elastomeric copolymers which can be bonded according to this invention are normally solid chain-saturated copolymers of at least one low molecular weight α-olefin. Elastomeric ethylene/propylene copolymers are preferred and elastomers, such as ethylene/propylene/non-conjugated dienes are especially useful because they are normally very resistant to bonding to substrates.

Preferred α-olefins include ethylene, propylene, 1-butene, 1-pentene, and 1-hexene. Other useful olefins include 4-methyl-1-pentene, 1-heptene, 1-octene, 1-decene, 5-methyl-1-nonene, 5,5-dimethyl - 1 - octene, 4-methyl-1-hexene, 4,4-dimethyl - 1 - pentene, 5-methyl-1-hexene, 4-methyl-1-heptene, 5-methyl-1-heptene, 4,4-dimethyl-1-hexene, 5,6,6-trimethyl-1-heptene, 1-dodecene, and 1-octadecene.

Dienes which can be used include 1,4-hexadiene; 1,9-octadecadiene; 6-methyl-1,5-heptadiene; 7-methyl-1,6-octadiene; 11-ethyl-1,11-tridecadiene; 9-ethyl - 1,9 - undecadiene; 7-ethyl-1,7-nonadiene; 8-propyl-1,8-undecadiene; 8-ethyl-1,8-decadiene; 10-ethyl - 1,9 - dodecadiene; 12-ethyl-1,12-tetradecadiene; 13-n-butyl-1,12-heptadecadiene; and 15-ethyl-1,15-heptadecadiene. Examples of cyclic dienes which can be used include dicyclopentadiene; tricyclopentadiene; tetracyclopentadiene; 5-alkenyl-substituted 2-norbornene; 5-methylene-2-norbornene; 2-alkyl-2,5-norbornadienes; and 5-ethylidene-2-norbornene.

Various α-olefin polymers which can be used for this invention are described in U.S. Pats. 2,933,480 to Gresham et al.; 3,365,418 to Nyce et al.; 3,425,983 to Wolfe; 3,467,633 to Harris; and 3,545,991 to Body.

Preferred α-olefin copolymers are the ethylene/higher α-olefin (EOM) copolymers including ethylene/propylene (EPM) and ethylene/propylene/non-conjugated diene (EPDM) copolymers such as ethylene/propylene/1,4-hexadiene polymer.

These α-olefin copolymers can be used in accordance with this invention as raw polymer, compounded polymer, or cured stock. Cured polymers have greater wear resistance, better elastomeric recovery properties, dimensional stability, and other properties of a cross-linked plastic or elastomeric polymer; therefore, this form is preferred. Copolymers can be cured by sulfur curing systems, resin curing systems, or peroxide curing systems according to known methods. A curable copolymer is typically compounded with at least one of the following for producing cured stock; curing agent, accelerators, plasticizers, extenders, particulate and fiber fillers, carbon black, lubricants, pigments, metal oxides, activators, anti-oxidants, anti-ozonants, and blowing agents. Compounded copolymers can be molded and cured by known methods and subsequently bonded to the substrate or a copolymer can be cured and bonded to the substrate in one operation.

Materials which can be used for substrates of this invention are generally materials which support, give dimensional stability, or impart desirable characteristics such as aesthetic, cosmetic, texture, handling, bulk, or particular functional characteristics to the laminated structure, particularly the α-olefin layer. Metal, building board, wood, glass, and polymeric film, fiber, or sheet can be used for the substrate of the laminated structures of this invention. Multiple layers of one or more of the various substrates and the α-olefin copolymers can be used to produce laminated structures; but typically, one layer of α-olefin copolymer is bonded to a single substrate for wear-resistance, chemical-resistance, or as an energy-absorbing structure.

Preferred laminated structures are made of metal and α-olefin copolymer. Metal, such as brass, copper, and aluminum, can be used; but for structural energy-absorbing and economical applications, various iron and steel substrates are preferred. These metals include iron, carbon-steel, low carbon steel, chrome steel, chrome-nickel steel, chrome-molybdenum steel, chromium-plated steel, zinc-coated steel, and primed steel.

Conventional cleaning and preparative treatments should be used, such as cleaning, degreasing, sand blasting, etching, priming, and pickling. Primed steel includes steel coated with conventional protective special purpose applications such as anti-rust formulations including phosphate and other chemicals. Such primer coatings can be used to improve bond strength for particular environments, to modify the surface, to prevent oxide formation, or to improve weathering characteristics.

The strength and energy-absorbing characteristics of these steels make them especially suitable for manufacturing laminates with preferred copolymers, such as EPDM copolymers, for applications such as impact resistant automobile bumpers. These metal substrates can be used in the form of sheet, wire, cable, or shaped articles; and the α-olefin copolymer layer can be shaped and attached to the area desired.

Other copolymers and generally materials having a polar surface can be used for the substrate of this invention. Polymers such as chlorosulfonated α-olefin polymers and polyurethane polymers can be used. Copolymers which have been surface treated by agents such as isocyanates and oxidants to produce a polar surface can be bonded to α-olefin copolymers by this invention.

Preparative treatment such as preheating or prime coating should be used prior to bonding, (1) when substrates which are subject to oxide formation or film formation are used, (2) when the adhesive is applied as a dispersion in granular form, (3) when the layers are bonded sometime after adhesive application, or (4) when the layers may absorb contaminants such as moisture.

Other substrates can be used for aesthetic, cosmetic, and functional purposes. For example, α-olefin copolymer can be metalized with a thin film of copper or aluminum. Foamed α-olefin copolymer can be bonded to building board panels for sound or heat insulation. Fibers such as fiebrglass, hair, wool, cotton, flax, silk, asbestos, and others can be bonded to α-olefin copolymer for producing articles having particular texture or wearing properties. Belts, curtains, vessel lining, etc., can be made in this manner.

Laminates can be manufactured by several methods according to this invention giving an α-olefin copolymer lamination system of great flexibility which can be readily adopted to a particular need. Generally, the laminating system consists essentially of interposing the ionomeric adhesive composition between the copolymer and substrate and bonding the layers at a temperature of about 140° C. and superatmospheric pressure.

Bonding is a function of temperature, time, and pressure. The minimum value of each variable is that which is necessary to bond the adhesive composition when the α-olefin copolymer and substrate do not require heat treatment such as curing. A minimum pressure, about 10–2000 p.s.i.g. (about 0.7.–140 kg./cm.$^2$) is necessary to maintain good contact between the laminate layers and adhesive and for efficient heating. With the minimum temperature, about 140° C., and pressure, bonding requires about 2–5 minutes or longer depending upon the laminate materials and thickness; at higher temperature, about 210–265° C., time of contact may be substantially reduced such as to about 10–60 seconds. Pressure may be applied by conventional methods such as clamping, platen presses, bag molding, or calendaring. The adhesive layer should be at least about 3 mils (about 0.07 mm.) thick and can be up to about 20 mils (about 0.5 mm.) thick. Thicker films can be used but are not generally economical or practical. The important feature is good coverage and contact between the adhesive and substrate layers. The film thickness is also a function of bonding temperature and pressure in that excess adhesive will be forced out of the laminate at high temperature and pressure.

The adhesive composition layer can be interposed between the copolymer and substrate layers by applying the adhesive in any one of several forms and by any one of several methods. The best method can be developed for each application in view of this disclosure by one skilled in the art. A preferred method consists essentially of applying a layer of adhesive to the copolymer surface and superimposing the treated copolymer on a substrate with the adhesive between them prior to bonding them. Adhesive can be applied to either the α-olefin copolymer substrate, to another substrate layer, or to both by a method such as one of the following:

(1) spraying the adhesive in granular form onto said layer with an electrostatic differential or at a temperature so that the adhesive attaches to said layer,
(2) flame spraying the adhesive in granular form onto said layer so that the heated adhesive particles attach to said layer with or without an electrostatic differential,
(3) contacting said substrate layer with adhesive particles suspended in a fluidized bed with an electrostatic differential or at a temperature so that adhesive attaches to said substrate,
(4) hot-melt extruding a layer of adhesive onto said substrate layer,
(5) roller coating or brushing said adhesive as a melt or as a dispersion onto said substrate, or
(6) applying a layer of adhesive in sheet form to said substrate with or without electrostatic differential or heat to attach the adhesive to said substrate.

A preferred method consists essentially of applying said adhesive in sheet or granular form prior to bonding and prior to uniting the various laminate substrates. When this method is used, the adhesive is preferably fused to the substrate layer by application of heat. Heating or fusing adhesive bonding laminate layers and adhesive or curing copolymer layers can be accomplished by conventional methods. Conventional conduction heating in a press used for polymers is a preferred method. Induction heating, such as with electromagnetic radiation (for example, microwave radiation), is preferred for fast processing methods. Radiant heating, such as with infrared (IR) radiation, can also be used.

A preferred laminate structure consists essentially of a structure in which the substrate is metal sheet, preferably steel, the carboxylic acid is acrylic or methacrylic acid, the divalent metal compound is zinc oxide, hydroxide, or acetate, and the solid copolymer is an ethylene/propylene/non-conjugated diene elastomer. This structure is especially useful for automobile bumper construction.

The following examples illustrate the invention. Parts, percentages, and proportions are by weight unless otherwise indicated.

Terms and methods used herein are designated as follows:

| | |
|---|---|
| Thermoplastic melt flow | ASTM D–1238–65T. |
| Adhesion of vulcanized rubber to metal (adhesion) | ASTM D–429–B. |
| Copolymer nomenclature | ASTM 1418–67. |
| Neutralization | Calculated. |

EXAMPLE I

Adhering cured loaded EPDM copolymer to chrome-plated steel bumper stock

In this example an ionomeric adhesive is used having a melt flow of 1.5 and consisting essentially of an ethylene/methacrylic acid copolymer (88 wt. percent/12 wt. percent) mixed with a little acetic acid and 0.27 equivalent of zinc oxide (27% of the methacrylic acid units have been neutralized).

A coupon of about 14 gauge (about 0.22 mm. thick) polished chrome-plated steel approximately 1" x 5.25" (2.54 x 13.34 cm.) is cut from an automobile bumper and degreased with tetrachloroethylene vapor. Each end of the coupon is covered by four layers of 0.5" x 0.001" (12.7 mm. x 0.0254 mm.) polyethylene terephthalate polyester film tape leaving about 4.25 inches (10.8 cm.) of the coupon exposed. Four layers of 3-mil (0.076 mm.) ionomeric adhesive film are placed on the exposed area of the coupon and subsequently fused at about 140° C. to form an ionomeric adhesive coating approximately 12 mils (0.3 mm.) thick.

An ethylene/propylene/1,4 - hexadiene copolymer (EPHD) stock is compounded according to the recipe described hereinafter and cured five minutes at 350° F. (177° C.). A strip of cured copolymer 1 x 6 x 0.25 inches (2.5 x 15.2 x 0.6 cm.) is placed on the adhesive-coated coupon. In the resulting laminate the EPHD stock extends about 0.37 inch (0.9 cm.) beyond each end of the coupon. The copolymer/adhesive/coupon laminate is placed in a 350° F. (177° C.) press at about 500 p.s.i.g. (35.2 kg./cm.²) for about two minutes, then removed from the press and cooled under pressure of a small weight.

When the resulting laminate is tested at 23° C. for adhesion at both ends according to test method ASTM D–429B, values of about 84–85 pounds per lineal inch (p.l.i.), (about 15–15.2 kg./cm.) are obtained with failure due to copolymer stock tear.

EXAMPLE II

Adhering EPDM copolymer to cold rolled steel and chrome-plated steel coupons (A) Coupons of cold rolled steel, measuring 1" x 5.5" (25.4 mm. x 140 mm.), are prepared as in I above by sandblasting and degreasing in the vapor of chlorinated solvents such as tetra-or trichloroethylene. The coupons' ends are covered with polyethylene terephthalate polyester film as in I.

The bare portions of each coupon are covered, in turn, with 3 to 5 sheets of the ionomeric adhesive film of 0.003" (0.076 mm.) thickness and with EPHD stock. The adhesive is fused by heating the covered coupons to about 140° C. for 5 minutes in a platen press.

Four ionomeric adhesive coated coupons are bonded to cured EPHD stock by the procedure of Example I except that when the laminate has been in the press for 2 minutes, heating is stopped while the press (still holding the laminate under pressure) is rapidly cooled with circulating water. For comparison, other cleaned and vapor degreased coupons are coated in turn with a multi-coating commercial adhesive and bonded to cured EPHD stock. Adhesion tests are run on these coupons according to ASTM D–429B method with the following results in pounds per lineal inch (p.l.i.) and kilogram per lineal centimeter (kg./cm.):

| | Temperature of— | | | | | | | |
|---|---|---|---|---|---|---|---|---|
| | 23° C. | | 50° C. | | 70° C. | | 90° C. | |
| | P.l.i. | Kg./cm. | P.l.i. | Kg./cm. | P.l.i. | Kg./cm. | P.l.i. | Kg./cm. |
| Ionomeric adhesive | 102 | 18.2 | 59 | 10.5 | 52 | 9.3 | 36 | 6.4 |
| Commercial adhesive | 35 | 6.2 | | | | | 10 | 1.8 |

(B) Unpolished chrome-plated steel coupons are bonded to cured EPHD stock by the procedure of Part A. Adhesion (ASTM D–429B) values for typical resulting laminates are as follows:

| | Temperature of— | | | |
|---|---|---|---|---|
| | 23° C. | | 70° C. | |
| | P.l.i. | Kg./cm. | P.l.i. | Kg./cm. |
| Ionomeric adhesive used | 96 | 17.1 | 95 | 17.0 |

EPDM RECIPES

| | | | |
|---|---|---|---|
| EPDH | 100 | "Sunpar" 115 oil | 40 |
| Zinc oxide | 5 | Sulfur | 3 |
| Zinc stearate | 1.5 | Vocol | 3 |
| FEF carbon black | 120 | Nobs Special | 1 |

This stock is cured at 177° C. for 5 minutes.

EPHD is an EPDM copolymer having the following properties:

Mooney viscosity (ML −1 +4/121° C.)—about 35

COMPOSITION

Monomer units:
  Ethylene _____ weight percent__ 57
  Propylene _____do____ 37±3
  1,4-hexadiene _____do____ 6
Sulfur-curable unsaturation: Ethylenic
  groups _____gm.-mol/kilogram__ 0.49

Sunpar 115 oil is a paraffinic petroleum oil type 104B tested according to ASTM D–2226 having a Saybolt Universal Viscosity of 155 sec. and 43.6 sec. at 100° F. (37.8° C.) and 210° F. (98.9° C.), respectively, and a viscosity-gravity constant of 0.808.

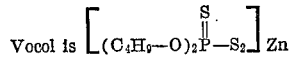

Nobs Special is 2(morpholinothio)benzothiazole having the formula

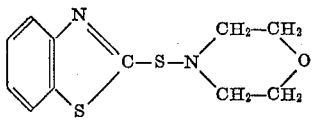

The commercial adhesive ultilized is a multi-coating proprietary composition commercially available for use in bonding EPDM rubber to metal consisting of (1) a primer of a mixture of polymer, organic compounds, and mineral fillers in a methyl isobutyl ketone and Cellosolve solvent system and (2) an adhesive consisting of dissolved organic polymer and dispersed filler in xylene and perchloroethylene solvent system.

I claim:

1. A bonded structure consisting essentially of a cured elastomeric copolymer of at least one $C_2$–$C_8$ α-olefin adhered to a substrate having a polar surface by a composition consisting essentially of
   (1) a normally solid, thermoplastic ionic copolymer of ethylene and $C_3$–$C_8$ α,β-unsaturated carboxylic acid containing about 3–25 weight percent of said acid units, and
   (2) about 0.05–0.60 equivalents of a polyvalent metal compound based on the acid groups in the ionic copolymer, the metal of said compound being selected from the group consisting of magnesium, calcium, strontium, barium, titanium, tin, iron, cobalt, nickel, copper, zinc, chromium, aluminum and cadmium.

2. A bonded structure of claim 1 in which the carboxylic acid is acrylic acid, methacrylic acid, or pentenoic acid and the polyvalent metal is magnesium, copper or zinc.

3. A bonded structure of claim 2 in which the elastomeric copolymer is a cured ethylene/propylene copolymer.

4. A bonded structure of claim 3 in which the elastomeric copolymer is a cured ethylene/propylene/non-conjugated diene elastomer.

5. A bonded structure of claim 1 in which the substrate is metal, building board, wood, glass or fiber, film or sheet of an organic polymer selected from the group consisting of chlorosulfonated α-olefin polymers and polyurethane polymers.

6. A bonded structure of claim 5 wherein the substrate is metal and the metal of the polyvalent metal compound is magnesium, copper or zinc.

7. A bonded structure of claim 6 wherein the $C_2$–$C_8$ α-olefin elastomeric copolymer is a cured ethylene/propylene copolymer.

8. A bonded structure of claim 6 wherein the $C_2$–$C_8$ α-olefin elastomeric copolymer is a cured ethylene/propylene/1,4-hexadiene copolymer.

9. A bonded structure of claim 6 wherein the $C_2$–$C_8$ α-olefin elastomeric copolymer is a cured ethylene/propylene/alkenyl-2-norbornene copolymer.

10. A bonded structure of claim 6 wherein the $C_2$–$C_8$ α-olefin elastomeric copolymer is a cured ethylene/propylene/5-ethylidene-2-norbornene copolymer.

11. A bonded structure of claim 6 wherein the $C_2$–$C_8$ α-olefin elastomeric copolymer is a cured ethylene/propylene/non-conjugated diene copolymer, the metal of the polyvalent metal compound is zinc, and the metal substrate is a chrome-plated automobile bumper.

12. A bonded structure of claim 1 in which the substrate is metal sheet, the carboxylic acid is acrylic or methacrylic acid, the polyvalent metal compound is zinc oxide, hydroxide, or acetate; and the solid copolymer is a cured ethylene/propylene/non-conjugated diene elastomer.

13. A bonded structure of claim 1 in which the α-olefin bonded is a cured ethylene/propylene/1,4-hexadiene copolymer.

14. A bonded structure of claim 1 in which the α-olefin bonded is a cured ethylene/propylene/alkenyl-2-norbornene copolymer.

15. A bonded structure of claim 1 in which the α-olefin bonded is a cured ethylene/propylene/5-ethylidene-2-norbornene copolymer.

16. A process for producing a bonded structure of claim 1 consisting essentially of (1) interposing a said adhesive composition, containing an ionic copolymer and a polyvalent metal compound, between a cured or compounded curable elastomeric copolymer of at least one $C_2$–$C_8$ α-olefin and the substrate and (2) heating the resulting structure at a temperature of at least about 140° C. and under superatmospheric pressure to bond said structure and cure any said compounded curable copolymer of α-olefin therein.

17. A process of claim 16 in which the polyvalent metal in the compound present in the adhesive is selected from the group consisting of magnesium, copper and zinc, and the elastomeric copolymer is an ethylene/propylene/non-conjugated diene copolymer, and the substrate is metal.

18. A process of claim 17 in which the elastomeric copolymer is a cured copolymer.

19. A process of claim 18 in which the upper temperature of heating is about 265° C.

20. A process of claim 16 in which the substrate is metal.

21. A process of claim 16 in which the metal is iron, carbon steel, chrome steel, chrome-nickel steel, chrome-molybdenum steel, chromium-plated steel, zinc-coated steel, or primed steel; and the elastomeric copolymer is an ethylene/propylene copolymer.

22. A process of claim 21 in which the adhesive is applied to the copolymer prior to bonding.

23. A process of claim 21 in which the adhesive is applied to the substrate prior to bonding.

References Cited

UNITED STATES PATENTS

| | | | |
|---|---|---|---|
| 3,423,231 | 1/1969 | Lutzman | 161—227 |
| 3,291,780 | 12/1966 | Gladding et al. | 260—80.5 |
| 3,151,173 | 12/1964 | Nyce | 260—88.2 D |
| 3,347,817 | 10/1967 | Gladding et al. | 260—41.5 |
| 3,264,272 | 8/1966 | Rees | 260—78.5 |
| 3,502,603 | 3/1970 | Gallagher | 260—29.3 |
| 3,344,014 | 9/1967 | Rees | 161—203 |

DANIEL J. FRITSCH, Primary Examiner

U.S. Cl. X.R.

156—309, 334; 161—203, 216, 217, 250, 253, 254, 255